(12) United States Patent
Hibino et al.

(10) Patent No.: US 10,298,158 B2
(45) Date of Patent: May 21, 2019

(54) CONTROLLER FOR ELECTRIC MOTOR

(71) Applicant: DAIKIN INDUSTRIES, LTD., Osaka-Shi, Osaka (JP)

(72) Inventors: Hiroshi Hibino, Kusatsu (JP); Nobuki Kitano, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/105,159

(22) PCT Filed: Jan. 6, 2015

(86) PCT No.: PCT/JP2015/050120
§ 371 (c)(1),
(2) Date: Jun. 16, 2016

(87) PCT Pub. No.: WO2015/105093
PCT Pub. Date: Jul. 16, 2015

(65) Prior Publication Data
US 2017/0005603 A1    Jan. 5, 2017

(30) Foreign Application Priority Data

Jan. 10, 2014    (JP) .................................. 2014-003101

(51) Int. Cl.
*H02P 6/12*     (2006.01)
*H02P 21/18*    (2016.01)
*H02P 25/024*   (2016.01)
*H02P 8/38*     (2006.01)
*H02P 21/00*    (2016.01)

(52) U.S. Cl.
CPC .................. *H02P 6/12* (2013.01); *H02P 8/38* (2013.01); *H02P 21/00* (2013.01); *H02P 21/18* (2016.02); *H02P 25/024* (2016.02)

(58) Field of Classification Search
CPC .......... H02P 6/12; H02P 21/18; H02P 25/024; H02P 8/38; H02P 21/00
USPC ........................................................ 318/400
See application file for complete search history.

(56) References Cited

U.S. PATENT DOCUMENTS

| 7,141,948 B2 | 11/2006 | Kifuku et al. |
| 8,310,187 B2 | 11/2012 | Yabuguchi et al. |
| 2002/0043953 A1* | 4/2002 | Masaki .................. B60L 11/14 318/700 |

(Continued)

FOREIGN PATENT DOCUMENTS

| CN | 1741368 A | 3/2006 |
| CN | 102035457 A | 4/2011 |

(Continued)

*Primary Examiner* — Eduardo Colon Santana
*Assistant Examiner* — Devon A Joseph
(74) *Attorney, Agent, or Firm* — Birch, Stewart, Kolasch & Birch, LLP

(57) ABSTRACT

A feedback amount calculation unit uses a deviation of a current from its command value or a deviation of an air-gap flux from its command value to calculate a feedback amount. A voltage error calculation unit calculates a variation range of a voltage error between a voltage value based on a voltage equation of the electric motor and a voltage command. The presence or absence of step-out of the electric motor is determined by comparison between the variation range of the voltage error and the feedback amount.

8 Claims, 5 Drawing Sheets

(56) References Cited

U.S. PATENT DOCUMENTS

| | | | |
|---|---|---|---|
| 2006/0043917 A1* | 3/2006 | Kifuku | B62D 5/0481 318/432 |
| 2008/0042613 A1* | 2/2008 | Aizawa | H02P 21/34 318/778 |
| 2010/0017063 A1* | 1/2010 | Maeda | B62D 5/0484 701/42 |
| 2010/0066283 A1* | 3/2010 | Kitanaka | B60L 11/1803 318/400.02 |
| 2010/0085006 A1* | 4/2010 | Sato | H02P 21/09 318/812 |
| 2011/0080126 A1* | 4/2011 | Yabuguchi | H02P 21/0003 318/400.21 |
| 2011/0315469 A1* | 12/2011 | Uryu | B62D 5/0463 180/443 |
| 2012/0139460 A1 | 6/2012 | Senkou et al. | |
| 2012/0200331 A1* | 8/2012 | Karlsson | H02M 3/156 327/175 |
| 2012/0206077 A1* | 8/2012 | Yoneshima | H02P 6/185 318/400.33 |
| 2014/0054103 A1* | 2/2014 | Kezobo | B62D 5/0487 180/446 |
| 2014/0091743 A1* | 4/2014 | Suzuki | H02P 29/027 318/400.22 |

FOREIGN PATENT DOCUMENTS

| | | |
|---|---|---|
| EP | 2 219 290 A1 | 8/2010 |
| JP | 2006-67731 A | 3/2006 |
| JP | 2008-92787 A | 4/2008 |
| JP | 2008-211911 A | 9/2008 |
| JP | 2010-51151 A | 3/2010 |
| JP | 2010-252503 A | 11/2010 |
| JP | 2013-31356 A | 2/2013 |

\* cited by examiner

F I G. 1
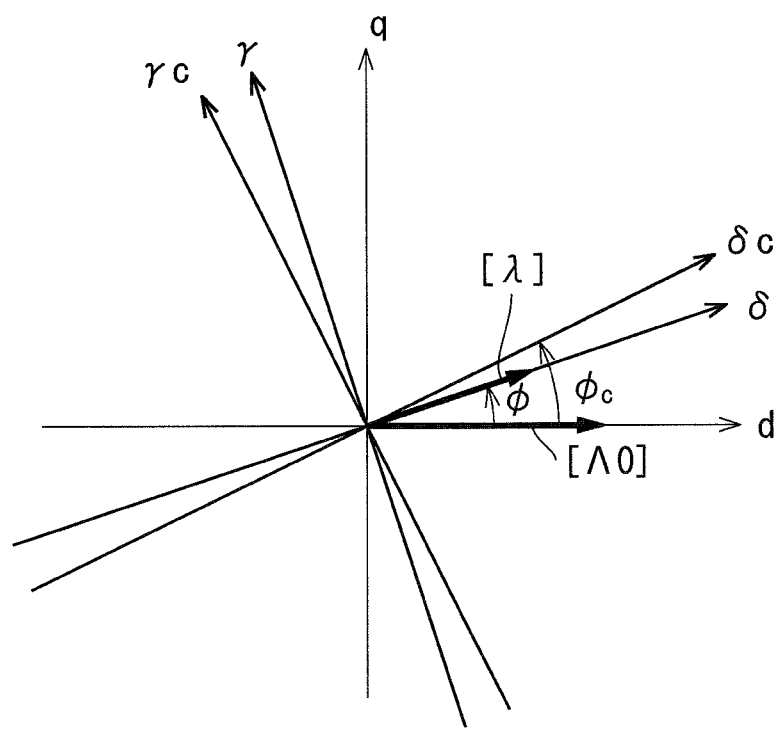

F I G. 5
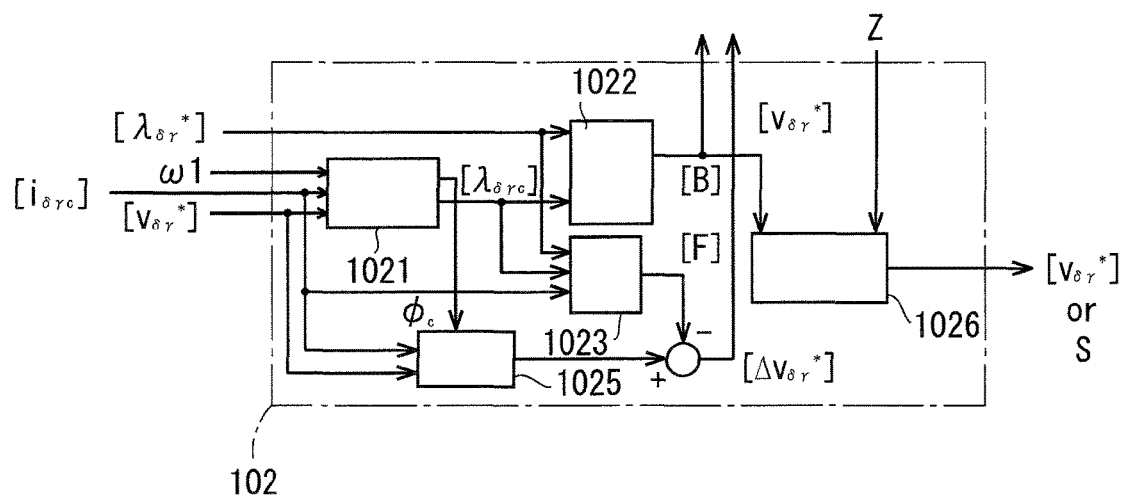

CONTROLLER FOR ELECTRIC MOTOR

TECHNICAL FIELD

The present invention relates to a technique for controlling an electric motor, and particularly to a technique for determining the occurrence of an abnormality in a synchronous motor.

BACKGROUND ART

Various techniques for detecting step-out of an electric motor have been conventionally developed. Among the documents exemplifying such techniques are Japanese Patent Application Laid-Open No. 2010-051151, Japanese Patent Application Laid-Open No. 2010-252503, and Japanese Patent Application Laid-Open No. 2008-92787.

Japanese Patent Application Laid-Open No. 2010-051151 discloses a technique for determining step-out from a deviation of a d-axis current and a q-axis command voltage.

Japanese Patent Application Laid-Open No. 2010-252503 discloses a technique for detecting step-out by comparison between a model voltage and a voltage command.

Japanese Patent Application Laid-Open No. 2008-92787 discloses a technique for determining step-out if a magnetic flux obtained from a current and a rotation speed command is not greater than a threshold.

SUMMARY OF INVENTION

Problem to be Solved by the Invention

The conventional techniques described above do not reflect variations in the specifications of electric motors, power modules that drive the electric motors, and detectors. Thus, a threshold for determining the occurrence of step-out needs to be decided experimentally. Such decision of a threshold causes a problem of increased man-hours in development.

This application therefore has an object to provide a technique for determining the presence or absence of an abnormality (e.g., step-out) of an electric motor.

Means to Solve the Problem

A controller for an electric motor according to the present invention controls a synchronous motor. The controller includes an electric motor drive unit (2, 104) that applies a voltage ($v_u$, $v_v$, $v_N$) based on a voltage command ($[v_{\delta\gamma}^*]$) to the synchronous motor, a feedback amount calculation unit (1022) that decides a feedback amount based on a deviation of a current ($[i_{\delta\gamma c}]$) flowing through the synchronous motor from a command value ($[i_{\delta\gamma}^*]$) of the current or a deviation of an air-gap flux ($[\lambda_{\delta\gamma c}]$) in the synchronous motor from a command value ($[\lambda_{\delta\gamma}^*]$) of the air-gap flux, a voltage command generation unit (1024) that generates the voltage command on the basis of the feedback amount, a voltage error calculation unit (1025) that calculates a range in which an error ($[\Delta v_{\delta\gamma}^*]$) between a voltage value based on a voltage equation of the synchronous motor and the voltage command varies, and a determination unit (109) that determines the occurrence of an abnormality in the synchronous motor when the feedback amount deviates from the range in which the error varies.

For example, the error ($[\Delta v_{\delta\gamma}^*]$) is set on the basis of a variation range decided by at least one of the current ($[i_{\delta\gamma c}]$), the voltage command ($[v_{\delta\gamma}^*]$), a manufacturing tolerance or a range of guarantee of an operating temperature of the synchronous motor (3), a manufacturing tolerance or a range of guarantee of an operating temperature of the electric motor drive unit, a manufacturing tolerance or a range of guarantee of an operating temperature of a detector that detects the current or the voltage, or a rotation angle velocity ($\omega_1$) of the synchronous motor.

For example, the range in which the error ($[\Delta v_{\delta\gamma}]$) varies is set on the basis of a variation range decided by at least one of a range in which an error ($e_{iJ}[I][i_{\delta\gamma c}]$) that is parallel in phase with the current ($[i_{\delta\gamma c}]$) varies, a range in which an error ($e_{iJ}[J][i_{\delta\gamma c}]$) that is orthogonal in phase to the current varies, a range in which an error ($e_A[\sin \varphi_c \cos \varphi_c]^t$) that is orthogonal in phase to a field flux ($[\Lambda 0]$) of the synchronous motor (3) varies, or a range in which an error ($e_v[v_{\delta\gamma}^*]$) that is parallel in phase with the voltage command ($[v_{\delta\gamma}^*]$) varies.

For example, the range in which the error ($[\Delta v_{\delta\gamma}^*]$) varies is set by a maximum value and/or a minimum value of the error in a combination of an upper limit and a lower limit of the variation range, the current ($[i_{\delta\gamma c}]$), and the voltage command ($[v_{\delta\gamma}^*]$).

For example, the range in which the error ($[\Delta v_{\delta\gamma}^*]$) varies is further set also on the basis of one term of the voltage equation. The controller further includes a feedforward amount calculation unit (1023) that decides a feedforward amount ($[F]$) based on a term of the voltage equation except for the one term. The voltage command generation unit (1024) further generates the voltage command ($[v_{\delta\gamma}^*]$) also on the basis of the feedforward amount.

For example, the controller further includes a feedforward amount calculation unit (1023) that decides a feedforward amount ($[F]$) based on the voltage equation. The voltage command generation unit (1024) further generates the voltage command ($[v_{\delta\gamma}^*]$) also on the basis of the feedforward amount ($[F]$).

Effects of the Invention

The controller for an electric motor according to the present invention determines the occurrence of an abnormality in the electric motor when the feedback amount deviates from a predetermined range.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a vector diagram illustrating the relationship between an air-gap flux and a field flux in a synchronous motor;

FIG. 5 is a block diagram illustrating a configuration of a voltage command calculation unit in a third embodiment.

DESCRIPTION OF EMBODIMENTS

Basic Concept of the Invention

Figure 2:
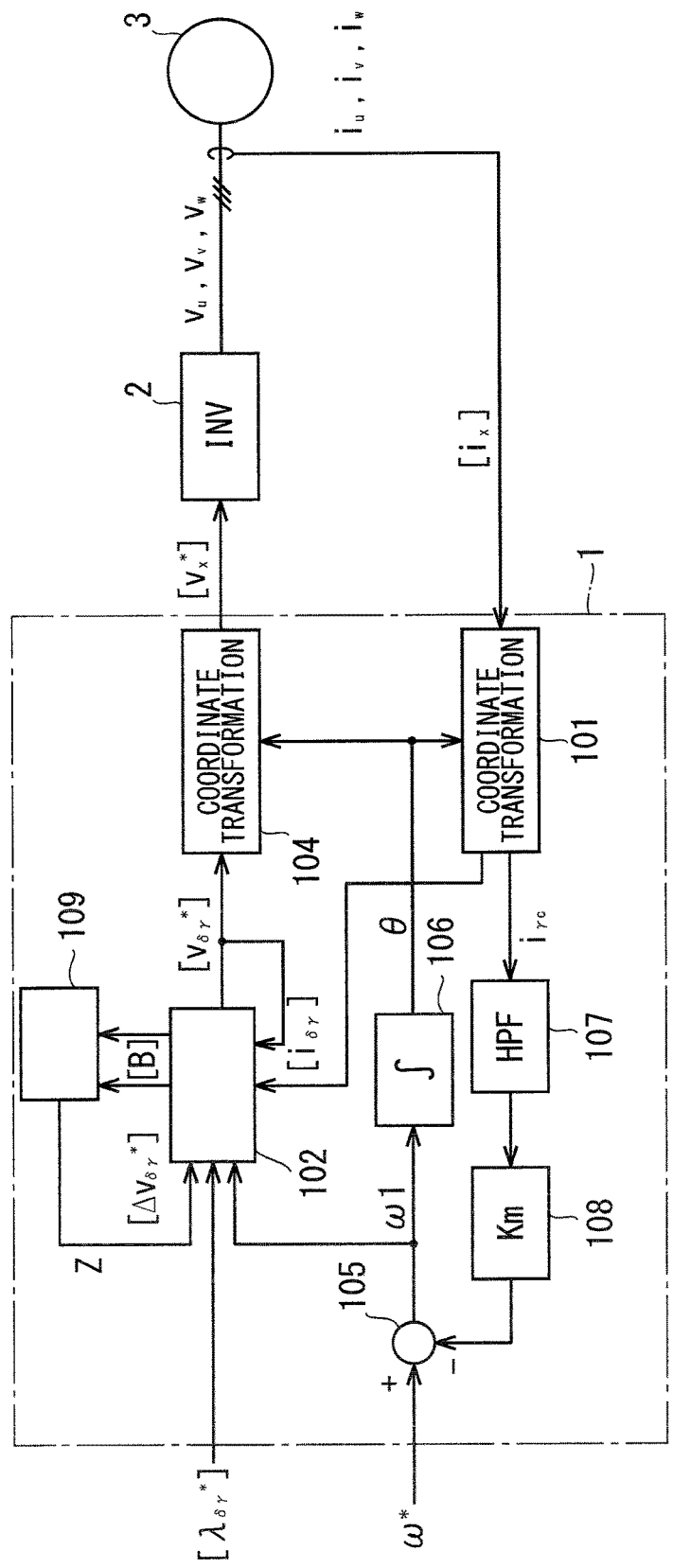
FIG. 2 is a block diagram illustrating a configuration of an electric motor controller according to a first embodiment and its peripheral devices.

The basic concept of the present invention will be described before detailed description of embodiments. Needless to say, this basic concept is also included in the present invention.

FIG. 1 is a vector diagram illustrating the relationship between an air-gap flux [λ] (unless otherwise specified, a symbol [ ] represents a vector quantity; the same holds true for the following) in a synchronous motor (hereinafter, merely referred to as an "electric motor"; although some special synchronous motors, such as switched reluctance motors, have no magnetic field, the synchronous motor herein refers to a synchronous motor having a magnetic field) and a field flux [Λ0] in the electric motor. For example, in the case where an electric motor has a permanent magnet, the field flux [Λ0] is generated by the permanent magnet, or in the case where an electric motor has a field winding, the field flux [Λ0] is generated by a current flowing through the field winding.

The d-q rotating coordinate system is introduced as a rotating coordinate system synchronized with the rotation of an electric motor. Herein, the d-axis is set in phase with the field flux [Λ0], and the phase of the q-axis leads with respect to the d-axis by 90 degrees in the direction toward which a rotation is intended to be made by control of the electric motor (hereinafter, merely referred to as a "direction of rotation").

Additionally, the δ-γ rotating coordinate system and the δc-γc rotating coordinate system are introduced as rotating coordinate systems. The phases of the δ-axis and the γ-axis lead respectively with respect to the d-axis and the q-axis toward the direction of rotation of the electric motor by a phase angle φ. The phases of the δc-axis and the γc-axis lead respectively with respect to the d-axis and the q-axis toward the direction of rotation of the electric moto by a phase angle φ$_c$. Hereinafter, for the sake of description, the phase angle φ of the δ-axis to the d-axis is referred to as an actual phase angle φ, and the phase angle φ$_c$ of the δc-axis to the q-axis is referred to as an estimated phase angle φ$_c$.

For example, in the method for controlling an electric motor, which is known as "primary magnetic flux control", the δ-axis is set in phase with the air-gap flux [λ].

As is well known, the air-gap flux [λ] is decided by the voltage and current supplied to an electric motor (more specifically, an armature winding of an armature included in the electric motor), the device constants of the electric motor (e.g., an inductance, a resistance component of the armature winding, and a field flux), and the rotation velocity of the electric motor. The estimated value [λ^] of the air-gap flux [λ] is thus obtained from the actual values (or command values or estimated values) of the voltage and current, device constants, and rotation velocity described above. The controller that controls the electric motor thus performs control such that the estimated value [λ^] is equal to a command value [λ*] of the air-gap flux [λ]. In the "primary magnetic flux control" described above, the γ-axis component of the command value [λ*] is zero.

When the δc-γc rotating coordinate system is employed in such control, the estimated phase angle φ$_c$ coincides with the actual phase angle φ, thus enabling appropriate control of the rotation of the electric motor. This is because if the device constants, the rotation velocity, and the voltage and current supplied to the electric motor are completely grasped, the air-gap flux [λ] coincides with the command value [λ*] by performing control such that the estimated value [λ^] obtained on the basis of these factors is equal to the command value [λ*].

The estimated phase angle φ$_c$, however, may differ from the actual phase angle φ due to, for example, a variation in load or disturbance. Such a difference is normally corrected by feedback control. A feedback amount used for feedback control (herein, merely referred to as a "feedback amount"), which is ideally zero, actually falls within a narrow range. If the difference between the estimated phase angle φ$_c$ and the actual phase angle φ is not eliminated even by feedback control, however, a feedback amount will increase.

The present invention focuses attention on this point, and is characterized by determining the occurrence of an abnormality in an electric motor by a feedback amount deviating from a predetermined range.

First Embodiment

FIG. 2 is a block diagram illustrating the configuration of an electric motor controller 1 according to this embodiment and its peripheral devices on the basis of the concept above.

An electric motor 3 is a three-phase electric motor and includes an armature (not shown) and a rotor that is a field. As a technical common sense, the armature has an armature winding, and the rotor rotates relative to the armature. Description will be made on a case where the field includes, for example, a magnet that generates a field flux.

A voltage supply source 2 includes, for example, a voltage control type inverter and a control unit therefor and applies a three-phase voltage $v_u$, $v_v$, $v_w$ based on a three-phase voltage command $[v_x^*]=[v_u^* v_v^* v_w^*]^t$ (the superscript "t" after a bracket represents the transposition of a matrix; the same holds true for the following) to the electric motor 3. This causes a three-phase current $[i_x]=[i_u\ i_v\ i_w]^t$ to flow through the electric motor 3. Note that the components of the voltage command [v*] and the three-phase current $[i_x]$ are described, for example, in order of a U-phase component, a V-phase component, and a W-phase component.

The electric motor controller 1 is a device that controls the air-gap flux [λ] and the rotation velocity (in the example below, the rotation angle velocity) on the electric motor 3. The air-gap flux [λ] is also referred to as a primary magnetic flux and is a synthesis of the field flux and the magnetic flux of armature reaction generated by an armature current (which is a three-phase current $[i_x]$ as well) flowing through the armature.

The electric motor controller 1 includes coordinate transformation units 101 and 104, a voltage command calculation unit 102, a subtracter 105, an integrator 106, a high pass filter 107, a constant multiplier unit 108, and a determination unit 109.

The coordinate transformation unit 101 transforms the three-phase current $[i_x]$ into a current $[i_{δγc}]=[i_{δc}\ i_{γc}]^t$ in the δc-γc rotating coordinate system. The three-phase current $[i_x]$ can be measured by a known technique, for example, with a detector (not shown).

The coordinate transformation unit 104 transforms the voltage command $[v_{δγ}^*]$ in the δc-γc rotating coordinate system into a voltage command $[v_x^*]$. In these transformations, a rotation angle θ in the δc-γc rotating coordinate system to the fixed coordinate system (e.g., the UVW fixed coordinate system) on the electric motor 3 is used. These transformations are achieved by a known technique, and thus, detailed description thereof will be omitted here.

The voltage command $[v_x^*]$ and the three-phase current $[i_x]$ may be represented in a so-called αβ fixed coordinate system (for example, the a-axis is set in phase with the U-phase) or any other rotating coordinate system instead of the three-phase UVW fixed coordinate system. The coordinate transformation units 101 and 104 perform transformations corresponding to these coordinate systems. The coordinate system employed for the voltage command $[v^*]$ is decided by a coordinate system on the basis of which the voltage supply source 2 operates. The voltage supply source 2 and the coordinate transformation unit 104 can be collectively regarded as an electric motor drive unit that applies a voltage $v_u$, $v_v$, $v_w$ based on the voltage command $[v_{\delta\gamma}^*]$ to the electric motor 3.

The integrator 106 calculates a phase angle θ on the basis of a rotation angle velocity $\omega_1$. The rotation angle velocity $\omega_1$ is obtained as an output of the subtracter 105. If the primary magnetic flux control has been performed, the subtracter 105 subtracts a value from a command value $\omega^*$ of the rotation angle velocity, the value being obtained by multiplying a predetermined value Km, in the constant multiplier unit 108, by a DC component removed a γc-axis component $i_{\delta c}$ of the current $[i_{\delta\gamma c}]$ in the high pass filter 107. This yields a rotation angle velocity $\omega_1$. When the air-gap flux $[\lambda]$ is controlled appropriately, $\varphi_c = \varphi$ as described above, thus resulting in $\omega_1 = \omega^*$.

The voltage command calculation unit 102 outputs the voltage command $[v_{\delta\gamma}^*]$, as well as a feedback amount [B] and a voltage error $[\Delta v_{\delta\gamma}^*]$ that serves as a basis of the predetermined range described in "Basic Concept". The determination unit 109 compares the feedback amount [B] and the threshold resulting from the voltage error $[\Delta v_{\delta\gamma}^*]$ and outputs a determination signal Z indicating whether an abnormality, for example, step-out has occurred in the electric motor or not.

Figure 3:
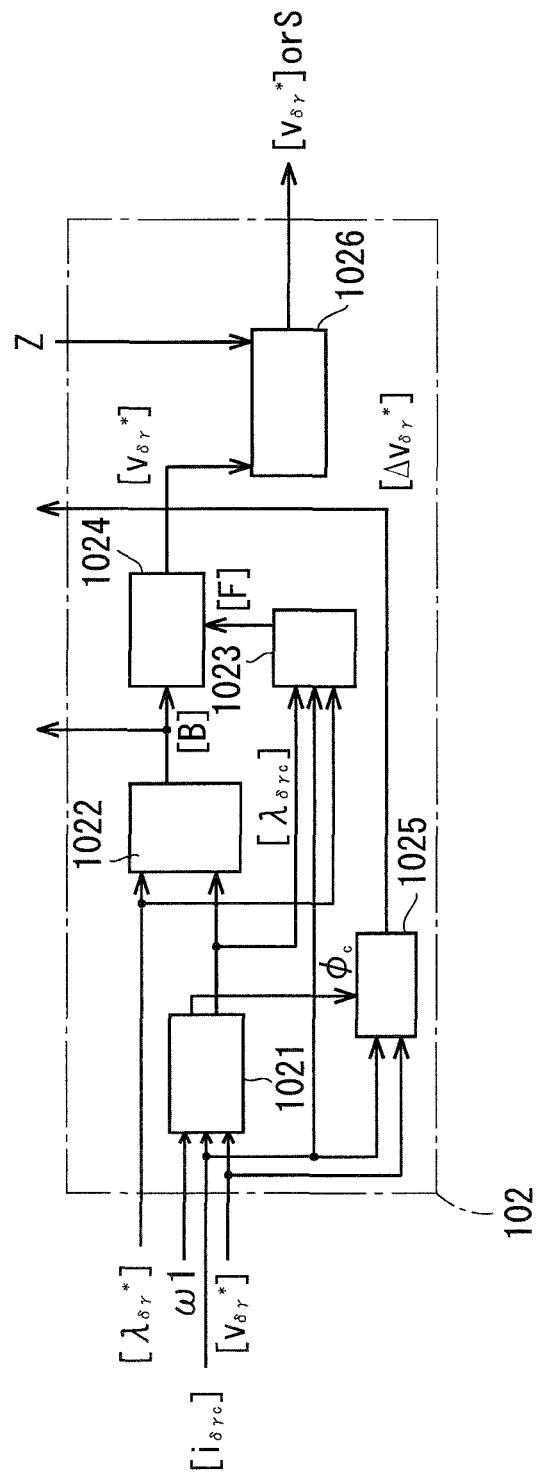
FIG. 3 is a block diagram illustrating a configuration of a voltage command calculation unit in the first embodiment.

FIG. 3 is a block diagram illustrating the configuration of the voltage command calculation unit 102. The voltage command calculation unit 102 includes a magnetic flux calculation unit 1021, a feedback amount calculation unit 1022, a feedforward amount calculation unit 1023, a voltage command generation unit 1024, a voltage error calculation unit 1025, and a voltage command output regulation unit 1026.

The magnetic flux calculation unit 1021 receives the current $[i_{\delta\gamma c}]$, the rotation angle velocity $\omega_1$, and the voltage command $[v_{\delta\gamma}^*]$ and outputs an estimated phase angle $\varphi_c$ and an air-gap flux $[\lambda_{\delta\gamma c}]$. The estimated value $[\lambda^{\wedge}]$ descried above may be employed as the air-gap flux $[\lambda_{\delta\gamma c}]$. Specifically, the estimated phase angle $\varphi_c$ and the air-gap flux $[\lambda_{\delta\gamma c}]$ can be obtained as follows.

In general, when a d-axis component $L_d$ and a q-axis component $L_q$ of the inductance of the armature winding of the electric motor 3, a δ-axis component $i_\delta$ and a γ-axis component $i_\gamma$ of the current flowing through the electric motor 3, a δ-axis component $v_\delta$ and a γ-axis component $v_\gamma$ of the voltage applied to the electric motor 3, an actual phase angle $\varphi$, an absolute value $\Lambda_0$ of a field flux, a resistance component R of the armature winding of the electric motor 3, a rotation angle velocity $\omega_1$, and a differential operator p are introduced, the following voltage equation (1) holds, where [I], [J], [C], and symbols [ ] surrounding these elements represent matrices.

$$\begin{bmatrix} v_\delta \\ v_\gamma \end{bmatrix} = R \begin{bmatrix} i_\delta \\ i_\gamma \end{bmatrix} + (p[I] + \omega_1 [J]) \begin{bmatrix} \lambda_\delta \\ \lambda_\gamma \end{bmatrix} \quad (1)$$

$$[I] = \begin{bmatrix} 1 & 0 \\ 0 & 1 \end{bmatrix}, [J] = \begin{bmatrix} 0 & -1 \\ 1 & 0 \end{bmatrix}, \begin{bmatrix} \lambda_\delta \\ \lambda_\gamma \end{bmatrix} = (L_0[I] + L_1[C]) \begin{bmatrix} i_\delta \\ i_\gamma \end{bmatrix} +$$

$$\Lambda_0 \begin{bmatrix} \cos\phi \\ -\sin\phi \end{bmatrix}$$

$$L_0 = \frac{L_d + L_q}{2}, L_1 = \frac{L_d - L_q}{2}, [C] = \begin{bmatrix} \cos(2\phi) & -\sin(2\phi) \\ -\sin(2\phi) & -\cos(2\phi) \end{bmatrix}$$

Similarly, a setup value $L_{dc}$ of the d-axis component and a setup value $L_{qc}$ of a q-axis component of the inductance of the armature winding, a δc-axis component $i_{\delta c}$ and a γc-axis component $i_{\gamma c}$ of the current flowing through the electric motor 3, a δc-axis component $v_{\delta c}$ and a γc-axis component $v_{\gamma c}$ of the voltage applied to the electric motor 3, an estimated phase angle $\varphi_c$, a setup value $\Lambda_{0c}$ of an absolute value of the field flux, a setup value $R_c$ of a resistance component of the armature winding of the electric motor 3, and the rotation angle velocity $\omega_1$ are introduced, and accordingly, the following voltage equation (2) holds in the δc-γc rotating coordinate system.

$$[\lambda_{\delta\gamma c}] = \begin{bmatrix} \lambda_{\delta c} \\ \lambda_{\gamma c} \end{bmatrix} = \left( L_{0c} \begin{bmatrix} 1 & 0 \\ 0 & 1 \end{bmatrix} + L_{1c} \begin{bmatrix} \cos(2\phi_c) & -\sin(2\phi_c) \\ -\sin(2\phi_c) & -\cos(2\phi_c) \end{bmatrix} \right) [i_{\delta\gamma c}] + \quad (2)$$

$$\Lambda_{0c} \begin{bmatrix} \cos\phi_c \\ -\sin\phi_c \end{bmatrix}$$

$$L_{0c} = \frac{L_{dc} + L_{qc}}{2}, L_{1c} = \frac{L_{dc} - L_{qc}}{2}$$

$$\phi_c = \tan^{-1} \frac{v_{\delta c} - R_c i_{\delta c} + \omega_1 L_{qc} i_{\gamma c}}{v_{\gamma c} - R_c i_{\gamma c} + \omega_1 L_{qc} i_{\gamma c}}$$

The δc-axis component $v_{\delta c}$ and the γc-axis component $v_{\gamma c}$ of the voltage are not actually measured, and thus, the magnetic flux calculation unit 1021 employs a voltage command $[v_{\delta\gamma}^*] = [v_\delta^* v_\gamma^*]^t$ in place of these components to obtain the estimated phase angle $\varphi_c$ and the air-gap flux $[\lambda_{\delta\gamma c}]$. The setup values $L_{dc}$, $L_{qc}$, $R_c$, and $\Lambda_{0c}$ can be stored in the magnetic flux calculation unit 1021 in advance.

In the steady state, the result of the operation by the differential operator p is zero, and thus, the voltage equation in the steady state is introduced as the following formula (3) from the formula (1).

$$\begin{bmatrix} v_\delta \\ v_\gamma \end{bmatrix} = R \begin{bmatrix} i_\delta \\ i_\gamma \end{bmatrix} + \omega_1 \begin{bmatrix} 0 & -1 \\ 1 & 0 \end{bmatrix} \begin{bmatrix} \lambda_\delta \\ \lambda_\gamma \end{bmatrix} \quad (3)$$

To correct the errors due to the differences between the setup values $L_{dc}$, $L_{qc}$, $R_c$, and $\Lambda_{oc}$ and the actual values $L_d$, $L_q$, R, and $\Lambda_0$ thereof with voltage commands, the voltage command $[v_{\delta\gamma}^*]$ is decided by a sum of the feedforward amount [F] and the feedback amount [B] of the following formula (4) using a deviation of the air-gap flux $[\lambda_{\delta\gamma c}]$ in the δc-γc rotating coordinate system from the command value $[\lambda^*]$, where a feedback gain Gλ ($\neq$0), and a δ-axis $\lambda_\delta^*$ and a γ-axis component $\lambda_\gamma^*$ of the command value $[\lambda^*]$ are introduced.

$$\begin{bmatrix} v_\delta^* \\ v_\gamma^* \end{bmatrix} = [F] + [B], [F] = R_c \begin{bmatrix} i_{\delta c} \\ i_{\gamma c} \end{bmatrix} + \omega_1 \begin{bmatrix} 0 & -1 \\ 1 & 0 \end{bmatrix} \begin{bmatrix} \lambda_{\delta c} \\ \lambda_{\gamma c} \end{bmatrix}, \quad (4)$$

$$[B] = G_\lambda \left( \begin{bmatrix} v_\delta^* \\ v_\gamma^* \end{bmatrix} - \begin{bmatrix} \lambda_{\delta c} \\ \lambda_{\gamma c} \end{bmatrix} \right)$$

The voltage command generation unit 1024 adds the feedforward amount [F] and the feedback amount [B] to obtain the voltage command [$v_{\delta\gamma}^*$].

To generate the feedforward amount [F], the feedforward amount calculation unit 1023 receives the air-gap flux [$\lambda_{\delta\gamma c}$] and the current [$i_{\delta\gamma c}$] to obtain the feedforward amount [F] in accordance with the formula (4). In other words, the feedforward amount [F] is obtained by the voltage equation in the steady state using the current [$i_{\delta\gamma c}$], the setup value $R_c$ of the resistance component, the rotation angle velocity $\omega_1$, and the air-gap flux [$\lambda_{\delta\gamma c}$].

To generate the feedback amount [B], the feedback amount calculation unit 1022 receives the air-gap flux [$\lambda_{\delta\gamma c}$] and the command value [$\lambda^*$] thereof to calculate the feedback amount [B] in accordance with the formula (4). Specifically, the deviation of the air-gap flux [$\lambda_{\delta\gamma c}$] from the command value [$\lambda^*$] is multiplied by the feedback gain $G\lambda$. The feedback gain $G\lambda$ can be stored in the feedback amount calculation unit 1022.

Although the feedback gain $G\lambda$ is expressed in scalar quantity in the formula (4), it may be expressed as a non-zero matrix of two rows and two columns, which acts on the deviation of the air-gap flux.

Ideally, if the feedback amount [B] is zero, the δ-axis component $\lambda_\delta^*$ and the γ-axis component $\lambda_\gamma^*$ respectively coincide with the δc-axis component $\lambda_{\delta c}$ and the γc-axis component $\lambda_{\gamma c}$, and the steady state expressed by the formula (3) is achieved by the control in the δc-γc rotating coordination system.

When the feedback control using such a feedback amount [B] has been performed appropriately, a discrepancy between the actual phase angle φ and the estimated phase angle $\varphi_c$ is small, and thus, an approximation can be made such that there is no discrepancy between the rotation angle velocity $\omega_1$ and the command value $\omega^*$. In this case, a concept of the voltage error [$\Delta v_{\delta\gamma}^*$] being an error of a voltage command is newly introduced, and time variations in air-gap flux [$\lambda_{\delta\gamma c}$] are also taken into account, so that the following formula (5) holds.

$$\begin{aligned}&[v_{\delta\gamma}^*] R_c [i_{\delta\gamma c}] + (p[I] + \omega_1[J])[\lambda_{\delta\gamma c}] - [\Delta v_{\delta\gamma}^*] \\ &[\Delta v_{\delta\gamma}^*] \approx (e_{iI}[I] + e_{iJ}[J])[i_{\delta\gamma c}] + e_\Lambda \begin{bmatrix} \sin\phi_c \\ \cos\phi_c \end{bmatrix} + e_v[v_{\delta\gamma}^*]\end{aligned} \quad (5)$$

That is to say, the voltage error [$\Delta v_{\delta\gamma}^*$] can be defined as a value obtained by subtracting the voltage command [$v_{\delta\gamma}^*$] from the voltage value ($R_c[i_{\delta\gamma c}]+(p[I]+\omega_1[J])[\lambda_{\delta\gamma c}]$) obtained from the voltage equation on the electric motor 3. The voltage error [$\Delta v_{\delta\gamma}^*$] can be approximated by the second expression of the formula (5).

Coefficients $e_{iI}$, $e_{iJ}$, $e_\Lambda$, and $e_v$ vary within the range of the variation decided by the manufacturing tolerance or the range of guarantee of the operating temperature of the electric motor 3, depending on the variations in the specifications of the electric motor 3, the voltage supply source 2 and the detector (not shown) for a current [$i_x$] (or the voltage input to the voltage supply source 2), and the rotation angle velocity $\omega_1$. The range in which the voltage error [$\Delta v_{\delta\gamma}^*$] that is an error of the voltage command depends on the current [$i_{\delta\gamma c}$], the estimated phase angle $\varphi_c$, and the voltage command [$v_{\delta\gamma}^*$], as well as the ranges of variations of the coefficients $e_{iI}$, $e_{iJ}$, $e_\Lambda$, and $e_v$.

That is to say, the voltage error [$\Delta v_{\delta\gamma}^*$] is set by the variation range decided by at least one of the current [$i_{\delta\gamma c}$], the voltage command [$v_{\delta\gamma}$], the manufacturing tolerance or the range of guarantee of the operating temperature of the electric motor 3 and the voltage supply source 2, the manufacturing tolerance or the range of guarantee of the operating temperature of the detector that detects the current [$i_{\delta\gamma c}$] or the voltage $v_u$, $v_v$, $v_w$, or the rotation angle velocity (si.

In more detail, the variation range is set by at least one of the range in which an error $e_{iI}[I][i_{\delta\gamma c}]$ that is parallel in phase with (is in phase with or in opposite phase with) the current [$i_{\delta\gamma c}$] varies, the range in which an error $e_{iJ}[J][i_{\delta\gamma c}]$ that is orthogonal in phase to the current [$i_{\delta\gamma c}$] varies, the range in which an error $e_\Lambda[\sin\varphi_c \cos\varphi_c]^t$ that is orthogonal in phase to the field flux [$\Lambda0$] varies, or the range in which an error $e_v[v_{\delta\gamma}^*]$ that is parallel in phase with the voltage command [$v_{\delta\gamma}^*$] varies.

Herein, the voltage error [$\Delta v_{\delta\gamma}^*$] corresponds to the feedback amount [B] (more specifically, [$\Delta v_{\delta\gamma}^*$]=−[B]). As described above, it is premised that the voltage error [$\Delta v_{\delta\gamma}^*$] has been subjected to feedback control such that a discrepancy between the actual phase angle φ and the estimated phase angle $\varphi_c$ is small. If the electric motor 3 steps out in operation, this premise will not hold. In such a case, thus, the feedback amount [B] exceeds the range in which the voltage error [$\Delta v_{\delta\gamma}^*$] varies. In other words, when the feedback amount [B] exceeds the range in which the voltage error [$\Delta v_{\delta\gamma}^*$] varies during feedback control, it is judged that the operation of the electric motor 3 has stepped out.

That is to say, the range in which the voltage error [$\Delta v_{\delta\gamma}^*$] varies serves as a threshold for the feedback amount [B] in judging the presence or absence of step-out. To calculate the range in which the voltage error [$\Delta v_{\delta\delta}^*$] varies in accordance with the right side of the second expression of the formula (5), the voltage error calculation unit 1025 receives the estimated phase angle $\varphi_c$, the current [$i_{\delta\gamma c}$], and the voltage command [$v_{\delta\gamma}^*$].

For example, the upper limits and the lower limits of the variation ranges of the coefficients $e_{iI}$, $e_{iJ}$, $e_\Lambda$, and $e_v$, the current [$i_{\delta\gamma c}$], the estimated phase angle $\varphi_c$, and the voltage command [$v_{\delta\gamma}^*$] are used to obtain maximum values and minimum values of the respective terms of the right side of the second expression of the formula (5). The voltage error [$\Delta v_{\delta\gamma}^*$] in the employment of the combination of the maximum values or the minimum values of the respective terms, which serves as a threshold, is compared with the feedback amount [B]. The voltage error calculation unit 1025 may calculate the coefficients $e_{iI}$, $e_{iJ}$, $e_\Lambda$, and $e_v$. In such a case, the voltage error calculation unit 1025 also receives the rotation angle velocity $\omega_1$.

This can be understood as follows: the range in which the voltage error [$\Delta v_{\delta\gamma}^*$] varies is set by the maximum value and/or the minimum value of the voltage error [$\Delta v_{\delta\gamma}^*$] in the combination of the upper limit and the lower limit of the variation range, the current [$i_{\delta\gamma c}$], and the voltage command.

In brief, a maximum absolute value that can be employed by the voltage error [$\Delta v_{\delta\gamma}^*$] shown in the right side of the formula (6) below may be employed as the threshold of the absolute value of the feedback amount [B].

$$\|[\Delta v_{\delta\gamma}^*]\| \approx \left\| (e_{iI}[I] + e_{iJ}[J])[i_{\delta\gamma c}] + e_\Lambda \begin{bmatrix} \sin\phi_c \\ \cos\phi_c \end{bmatrix} + e_v[v_{\delta\gamma}^*] \right\| \quad (6)$$

Alternatively, the formula (7) below holds, and thus, the rightmost side of the formula (7) may be employed as a threshold. This is desirable from the viewpoint of reducing an amount of operations. The rightmost side does not include the estimated phase angle $\varphi_c$, and thus can be employed for a control system that does not output the estimated phase angle $\varphi_c$ by the magnetic flux calculation unit 10.

$$\|[\Delta v^*_{\delta\gamma}]\| \approx \left| (e_{iI}[I] + e_{iJ}[J])[i_{\delta\gamma c}] + e_\wedge \begin{bmatrix} \sin\phi_c \\ \cos\phi_c \end{bmatrix} + e_v[v^*_{\delta\gamma}] \right| \quad (7)$$

$$\leq |(e_{iI}[I] + e_{iJ}[J])| \|[i_{\delta\gamma c}]\| + |e_\wedge| + |e_v| \|[v^*_{\delta\gamma}]\|$$

During the constant speed operation, the rotation angle velocity $\omega_1$ is constant, and thus, $|e_{iI}[I]+e_{iJ}[J]|$, $|e_\wedge|$, and $|e_v|$ have constant values that will not change.

Alternatively, the feedback amount [B] and the voltage error $[\Delta v^*_{\delta\gamma}]$ may be compared for each of the δc-axis component and the γc-axis component. Or, they may be compared for only one of the components. This is desirable from the viewpoint of reducing an amount of operations. For example, in the formula (8), a maximum absolute value of the γc-axis component $\Delta v_\gamma^*$ of the voltage error $[\Delta v^*_{\delta\gamma}]$, which is to be compared with the feedback amount [B] for the γc-axis component, is obtained. Thus, the rightmost side of the formula (8) may be compared with the feedback amount [B].

$$\Delta v_\gamma^* \approx e_{iI} i_{\gamma c} + e_{iJ} i_{\delta c} + e_\wedge \cos\varphi_c + e_v v_\gamma^* \leq |e_{iI}||i_{\lambda c}| + |e_{iJ}||i_{\delta c}| + |e_\wedge| + |e_v||v_\gamma^*| \quad (8)$$

The determination unit 109 receives the voltage error $[\Delta v^*_{\delta\gamma}]$ and compares the threshold described above or the voltage error $[\Delta v^*_{\delta\gamma}]$ with the feedback amount [B] to output the determination signal Z. Although the threshold described above is generated by, for example, determination unit 109, a block that obtains a threshold from the voltage error $[\Delta v^*_{\delta\gamma}]$ may be provided separately in the voltage command calculation unit 102.

The voltage command output regulation unit 1026 receives the determination signal Z and the voltage command $[v^*_{\delta\gamma}]$. The voltage command output regulation unit 1026 outputs the voltage command $[v^*_{\delta\gamma}]$ in cases except for the case in which the determination signal Z indicates step-out. When the determination signal Z indicates step-out, the voltage command output regulation unit 1026 outputs a stop command S in place of the voltage command $[v^*_{\delta\gamma}]$ to stop the operation of the voltage supply source 2. This prevents driving of the electric motor 3 that remains stepping out.

In this embodiment, a threshold is set on the basis of, for example, the current $[i_{\delta\gamma c}]$ or the voltage command $[v^*_{\delta\gamma}]$, resulting in an appropriate threshold according to the operation state. This is desirable from the viewpoints of increasing the accuracy of detecting step-out and reducing false detections of step-out.

The threshold is set on the basis of the variation range decided by the manufacturing tolerance or the range of guarantee of the operation temperature, reducing a need for experimentally deciding a threshold. This is desirable from the viewpoint of a greatly reduced man-hours in development compared with the method of experimentally deciding a threshold.

Second Embodiment

A second embodiment will describe a technique for obtaining a feedback amount [B] from a current deviation.

Specifically, the feedback amount [B] is obtained in accordance with the formula (9), where a feedback gain $G_i(\neq 0)$ and a command value $[i^*_{\delta\gamma}]=[i^*_\delta i^*_\gamma]^t$ of a current $[i_{\delta\gamma c}]$ are introduced. As in the first embodiment, the feedback gain $G_i$ may be a non-zero matrix of two rows and two columns that acts on a current deviation.

$$[B] = G_i\left( \begin{bmatrix} i^*_\delta \\ i^*_\gamma \end{bmatrix} - \begin{bmatrix} i_{\delta c} \\ i_{\gamma c} \end{bmatrix} \right) \quad (9)$$

When the feedback amount [B] is obtained as described above, in place of the air-gap flux $[\lambda_{\delta\gamma c}]$ and the command value $[\lambda^*_{\delta\gamma}]$ thereof, the current $[i_{\delta\gamma c}]$ and the command value $[i^*_{\delta\gamma}]$ thereof are input to a feedback amount calculation unit 1022.

The configuration of an electric motor controller 1 according to this embodiment thus differs from the configuration of the electric motor controller 1 according to the first embodiment in that not the command value $[\lambda^*_{\delta\gamma}]$ of the air-gap flux but the command value $[i^*_{\delta\gamma}]$ of the current is input to a voltage command calculation unit 102.

Figure 4:
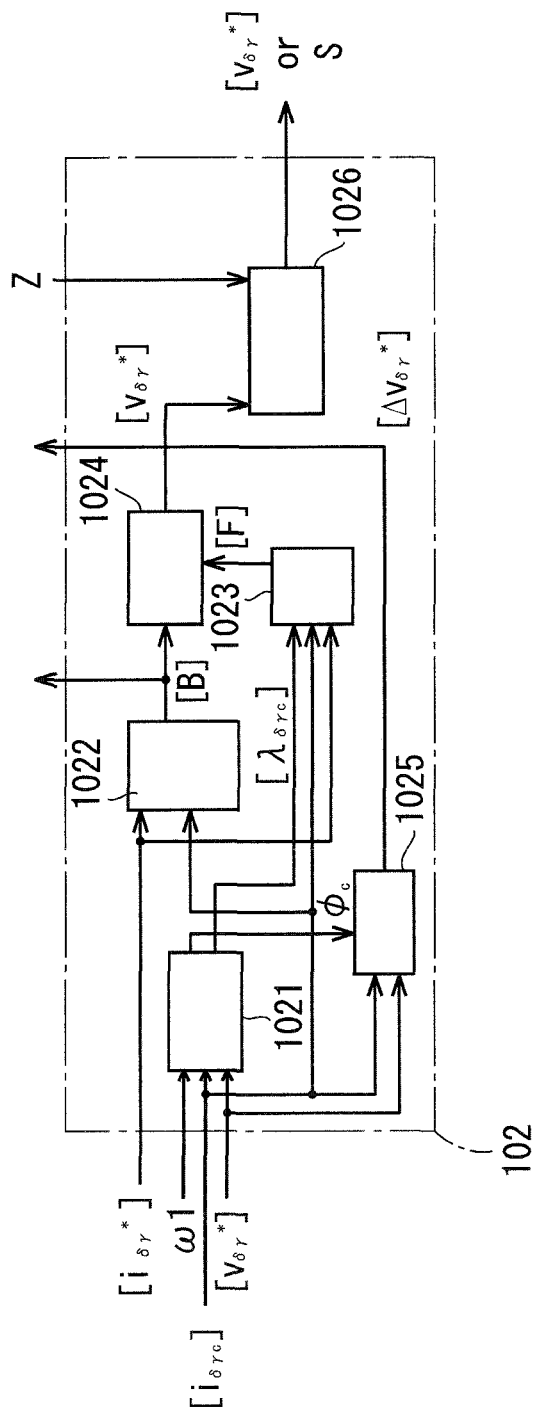
FIG. 4 is a block diagram illustrating a configuration of a voltage command calculation unit in a second embodiment.

FIG. 4 is a block diagram illustrating the configuration of the voltage command calculation unit 102 in this embodiment.

Also in this embodiment, the voltage error $[\Delta v^*_{\delta\gamma}]$ can be decided as in the first embodiment. Additionally, the presence or absence of step-out can be determined by performing the process as in the first embodiment.

It can be understood from the first embodiment and this embodiment that the feedback amount [B] is decided on the basis of a deviation of one of the current $[i_{\delta\gamma c}]$ or the air-gap flux $[\lambda_{\delta\gamma c}]$ from the command value ($[i^*_{\delta\gamma}]$, $[\lambda^*_{\delta\gamma}]$) thereof.

Third Embodiment

This embodiment will describe a case in which only feedback control is performed without feedforward control. In this case, as expressed by the formula (10) below, the voltage command $[v^*_{\delta\gamma}]$ is equal to the feedback amount [B].

$$\begin{bmatrix} v^*_\delta \\ v^*_\gamma \end{bmatrix} = [B] = G_\lambda \left( \begin{bmatrix} \lambda^*_\delta \\ \lambda^*_\gamma \end{bmatrix} - \begin{bmatrix} \lambda_{\delta c} \\ \lambda_{\gamma c} \end{bmatrix} \right) \quad (10)$$

FIG. 5 is a block diagram illustrating the configuration of a voltage command calculation unit 102 in this embodiment. The voltage command generation unit 1024 described in the first embodiment and the second embodiment is not required, and a feedback amount calculation unit 1022 outputs a feedback amount [B] as the voltage command $[v^*_{\delta\gamma}]$.

Meanwhile, a feedforward amount calculation unit 1023 calculates a feedforward amount [F] as described in the first embodiment and the second embodiment. The voltage error $[\Delta v^*_{\delta\gamma}]$ employed in the first embodiment and the second embodiment is corrected herein by subtracting the feedforward amount [F] therefrom. In this embodiment, a symbol $[\Delta v^*_{\delta\gamma}]$ is used for a voltage error that is corrected by subtracting the feedforward amount [F] therefrom.

That is to say, the voltage error $[\Delta v^*_{\delta\gamma}]$ is obtained from the formula (11) below in this embodiment.

$$[\Delta v_{\delta\gamma}^*] \approx \quad (11)$$

$$((e_{iI} - R_c)[I] + e_{iJ}[J])[i_{\delta\gamma c}] - \omega_1[J][\lambda_{\delta\gamma c}] + e_\Lambda \begin{bmatrix} \sin\phi_c \\ \cos\phi_c \end{bmatrix} + e_v[v_{\delta\gamma}^*]$$

In the use of the feedback amount [B] itself as the voltage command [$v_{\delta\gamma}^*$], the voltage error [$\Delta v_{\delta\gamma}^*$] decided by the formula (11) can be used to determine the presence or absence of step-out as in the first embodiment. This is apparent from the formulae (4) and (5).

The above reveals that also in this embodiment, the presence or absence of step-out can be determined by performing the process as in the first embodiment.

Needless to say, also in this embodiment, the product of the current deviation and the feedback gain $G_i$ may be used as the feedback amount [B] as in the second embodiment. In that case, the feedback amount [B] obtained by the formula (9) is employed as the voltage command [$v_{\delta\gamma}$]. As in the second embodiment, thus, in place of the air-gap flux [$\lambda_{\delta\gamma c}$] and the command value [$v_{\delta\gamma}^*$] thereof, the current [$i_{\delta\gamma c}$] and the command value [$i_{\delta\gamma}^*$] thereof are input to the feedback amount calculation unit 1022.

As described above, on what the voltage error [$\Delta v_{\delta\gamma}^*$] is based differs depending on whether only the feedback amount [B] is used or the feedforward amount [F] is also used to obtain the voltage command [$v_{\delta\gamma}^*$]. In the case where the voltage command [$v_{\delta\gamma}^*$] is not based on the feedforward amount [F], as in this embodiment, the voltage error [$\Delta v_{\delta\gamma}^*$] is set also on the basis of the feedforward amount [F]. In the case where the voltage command [$v_{\delta\gamma}$] is based on the feedforward amount [F], as in the first and second embodiments, the voltage error [$\Delta v_{\delta\gamma}^*$] is not based on the air-gap flux [$\lambda_{\delta\gamma c}$] (see the second expression of the formula (5)).

The feedforward amount [F] may be set on the basis of a term of the voltage equation except for one term. In this case, the range in which the voltage error [$\Delta v_{\delta\gamma}^*$] varies is set also on the basis of the one term.

Variation 1

The coefficients $e_{iI}$, $e_{iJ}$, $e_\Lambda$, and $e_v$ can be affected by the variations in the device constant of the electric motor 3, as well as variations on circuit. For example, the coefficients $e_{iI}$ and $e_{iJ}$ are affected by the variations in the detector (not shown) that detects a current [$i_x$], and the coefficient $e_v$ is affected by the variations in the detector (not shown) that detects a voltage input to the voltage control type inverter (not shown) of the voltage supply source 2 or a voltage $v_u$, $v_v$, $v_w$ output therefrom. Note that the variations on the circuit, however, has a less effect on the voltage error [$\Delta v_{\delta\gamma}^*$] than the variations in the device constant of the electric motor 3. If the variations on the circuit are disregarded, thus, step-out can actually be determined.

In the case where variations except for the variations in detector have less effects on the voltage error [$\Delta v_{\delta\gamma}^*$], step-out can be virtually determined if such variations are disregarded.

Alternatively, for example, only the variations that affect the voltage error [$\Delta v_{\delta\gamma}^*$] most may be taken into account.

Variation 2

A maximum value of the voltage error [$\Delta v_{\delta\gamma}^*$], which is a threshold to be compared with the feedback amount [B], may be calculated in advance on the worst conditions within the operation range assumable for the electric motor 3 and may be stored.

In this case, the voltage error calculation unit 1025 has a small amount of operations, and the memory thereof can have a small capacity. Or, a table simply showing a threshold can replace the voltage error calculation unit 1025.

For example, thresholds are obtained in advance for respective rotation angle velocities and are stored as a table.

Needless to say, the threshold may be set to be greater than the maximum value of the voltage error [$\Delta v_{\delta\gamma}^*$] in consideration of a margin.

Variation 3

An estimated phase angle $\varphi_c$ is small, and thus can be approximated to zero to obtain a threshold.

A threshold may be obtained within an assumable range that can be taken by the estimated phase angle $\varphi_c$ on the conditions on which no step-out occurs. For example, in the operation without step-out within the range of the estimated phase angle $\varphi_c$ of $-90°$ to $90°$ (such control is employed in, for example, primary magnetic flux control), $-1 \leq \sin\varphi_c \leq 1$ and $0 \leq \cos\varphi_c \leq 1$ are employed to obtain a threshold.

When the estimated phase angle $\varphi_c$ is approximated to zero or $-1 \leq \sin\varphi_c \leq 1$ and $0 \leq \cos\varphi_c \leq 1$ are employed to obtain a threshold, the estimated phase angle $\varphi_c$ itself needs not to be obtained. In the control that needs not to obtain the estimated phase angle $\varphi_c$ except for obtaining a threshold, an amount of operations for obtaining the estimated phase angle $\varphi_c$ (see the formula (2)) can be reduced.

Obtaining a threshold within an assumable range that can be taken by the estimated phase angle $\varphi_c$ on the conditions on which no step-out occurs is advantageous in that an abnormality can be determined also in the case of the operation range beyond expectation.

The various embodiments and variations above can be appropriately combined with each other unless their functions are impaired.

The block diagrams above are schematic, and the respective units can be configured as hardware or can be configured as a microcomputer (including a memory device) whose functions are implemented by software. Various procedures executed by the respective units or some or all of the means or functions implemented thereby may be implemented by hardware.

The microcomputer executes the respective process steps (in other words, a procedure) described in a program. The memory device above can be constituted of one or a plurality of memory devices such as a ROM (Read Only Memory), a RAM (Random Access Memory), a rewritable nonvolatile memory (EPROM (Erasable Programmable ROM) or the like), and a hard disk unit. The memory device stores therein, for example, various types of information and data, stores therein a program to be executed by the microcomputer, and provides a work area for execution of the program. It can be understood that the microcomputer functions as various means corresponding to the respective process steps described in the program or that the microcomputer implements various functions corresponding to the respective process steps.

While the invention has been shown and described in detail, the foregoing description is in all aspects illustrative and not restrictive. It is therefore understood that numerous modifications and variations can be devised without departing from the scope of the invention.

The invention claimed is:

1. A controller for an electric motor, said controller controlling a synchronous motor, said controller comprising:
   an electric motor drive unit that applies a voltage based on a voltage command to said synchronous motor;

a feedback amount calculation unit that decides a feedback amount based on a deviation of a current flowing through said synchronous motor from a command value of said current or a deviation of an air-gap flux in said synchronous motor from a command value of said air-gap flux;

a voltage command generation unit that generates said voltage command on the basis of said feedback amount;

a voltage error calculation unit that calculates a range in which an error between a voltage value based on a voltage equation of said synchronous motor and said voltage command varies; and a determination unit that determines an occurrence of an abnormality in said synchronous motor when said feedback amount deviates from the range in which said error varies, wherein said error is set on the basis of a variation range decided by at least one of said current, said voltage command, a manufacturing tolerance or a range of guarantee of an operating temperature of said synchronous motor, a manufacturing tolerance or a range of guarantee of an operating temperature of said electric motor drive unit, a manufacturing tolerance or a range of guarantee or an operating temperature of a detector that detects said current or said voltage, or a rotation angle velocity of said synchronous motor.

2. The controller for an electric motor according to claim 1, wherein the range in which said error varies is set on the basis of a variation range decided by at least one of a range in which an error that is parallel in phase with said current varies, a range in which an error that is orthogonal in phase to said current varies, a range in which an error that is orthogonal in phase to a field flux of said synchronous motor varies, or a range in which an error that is parallel in phase with said voltage command varies.

3. The controller for an electric motor according to claim 1, wherein the range in which said error varies is set by a maximum value and/or a minimum value of said error in a combination of an upper limit and a lower limit of said variation range, said current, and said voltage command.

4. The controller for an electric motor according to claim 2, wherein the range in which said error varies is set by a maximum value and/or a minimum value of said error in a combination of an upper limit and a lower limit of said variation range, said current, and said voltage command.

5. A controller for an electric motor, said controller controlling a synchronous motor, said controller comprising:
an electric motor drive unit that applies a voltage based on a voltage command to said synchronous motor;
a feedback amount calculation unit that decides a feedback amount based on a deviation of a current flowing through said synchronous motor from a command value of said current or a deviation of an air-gap flux in said synchronous motor from a command value of said air-gap flux;

a voltage command generation unit that generates said voltage command on the basis of said feedback amount;

a voltage error calculation unit that calculates a range in which an error between a voltage value based on a voltage equation of said synchronous motor and said voltage command varies; and a determination unit that determines an occurrence of an abnormality in said synchronous motor when said feedback amount deviates from the range in which said error varies, wherein the range in which said error varies is set on the basis of a variation range decided by at least one of a range in which an error that is parallel in phase with said current varies, a range in which an error that is orthogonal in phase to said current varies, a range in which an error that is orthogonal in phase to a field flux of said synchronous motor varies, or a range in which an error that is parallel in phase with said voltage command varies.

6. The controller for an electric motor according to claim 5, wherein the range in which said error varies is set by a maximum value and/or a minimum value of said error in a combination of an upper limit and a lower limit of said variation range, said current, and said voltage command.

7. The controller for an electric motor according to claim 1, wherein
the range in which said error varies is further set also on the basis of one term of said voltage equation,
said controller further comprises a feedforward amount calculation unit that decides a feedforward amount based on a term of said voltage equation except for said one term, and
said voltage command generation unit further generates said voltage command also on the basis of said feedforward amount.

8. The controller for an electric motor according to claim 1, further comprising
a feedforward amount calculation unit that decides a feedforward amount based on said voltage equation,
wherein said voltage command generation unit further generates said voltage command also on the basis of said feedforward amount.

* * * * *